US012502757B2

(12) United States Patent
Liu et al.

(10) Patent No.: US 12,502,757 B2
(45) Date of Patent: Dec. 23, 2025

(54) INTELLIGENT IDENTIFICATION APPARATUS AND METHOD FOR NAIL GUN PUNCH NEEDLE

(71) Applicant: Hangzhou Kelong Electric Devices Co., Ltd., Hangzhou (CN)

(72) Inventors: Wenping Liu, Hangzhou (CN); Guomin Yan, Hangzhou (CN)

(73) Assignee: Hangzhou Kelong Electric Devices Co., Ltd., Hangzhou (CN)

(*) Notice: Subject to any disclaimer, the term of this patent is extended or adjusted under 35 U.S.C. 154(b) by 52 days.

(21) Appl. No.: 18/708,000

(22) PCT Filed: Oct. 11, 2023

(86) PCT No.: PCT/CN2023/123971

§ 371 (c)(1),
(2) Date: May 7, 2024

(87) PCT Pub. No.: WO2025/076722

PCT Pub. Date: Apr. 17, 2025

(65) Prior Publication Data

US 2025/0312905 A1 Oct. 9, 2025

(30) Foreign Application Priority Data

Oct. 9, 2023 (CN) ......................... 202311301592.6

(51) Int. Cl.
*B25C 1/06* (2006.01)
*B25B 7/00* (2006.01)
(Continued)

(52) U.S. Cl.
CPC ................ *B25C 1/06* (2013.01); *B25C 1/001* (2013.01); *B25C 7/00* (2013.01)

(58) Field of Classification Search
CPC .............. B25C 1/06; B25C 1/001; B25C 7/00
See application file for complete search history.

(56) References Cited

U.S. PATENT DOCUMENTS

2018/0126528 A1* 5/2018 Pomeroy .................. B25C 5/13
2018/0178361 A1* 6/2018 Kabbes .................. B25C 1/008
(Continued)

FOREIGN PATENT DOCUMENTS

CN 114851134 A * 8/2022 ............... B25C 1/00
WO WO-2008029513 A1 * 3/2008 ................ B25F 5/00

*Primary Examiner* — Lucas E. A. Palmer
(74) *Attorney, Agent, or Firm* — Proi Intellectual Property US

(57) ABSTRACT

The present invention discloses an intelligent identification mechanism for a nail gun punch pin. The intelligent identification mechanism includes a nail clip, an assembly frame body and an energy storage body. The nail clip is set below the assembly frame body for feeding nails into the assembly frame body. The energy storage body is set in the rear of the assembly frame body. A motor is arranged within the nail gun shell for driving the punch pin to drive a cam to rotate. The present invention arranges an identification hole on the punch pin; cooperating with the inductive photocoupler, the identification hole can continuously obtain three in-place signals, and then use the control circuit to control communication with the motor, so as to identify four kinds of working conditions: normal operation, assembly failure, nail stuck in punch pin, and rebound failure; and generate corresponding alarm signals according to the conditions.

5 Claims, 18 Drawing Sheets

(51) Int. Cl.

| | |
|---|---|
| ***B25C 1/00*** | (2006.01) |
| ***B25C 7/00*** | (2006.01) |

(56) References Cited

U.S. PATENT DOCUMENTS

| | | | | |
|---|---|---|---|---|
| 2023/0390909 | A1* | 12/2023 | Suarez .................... | B25C 1/008 |
| 2024/0253196 | A1* | 8/2024 | Miller .................... | B25C 1/047 |
| 2025/0114928 | A1* | 4/2025 | Liu .......................... | B25C 1/008 |

* cited by examiner

INTELLIGENT IDENTIFICATION APPARATUS AND METHOD FOR NAIL GUN PUNCH NEEDLE

TECHNICAL FIELD

The present invention relates to the field of power tools, and specifically relates to a nail gun punch pin intelligent identification mechanism and identification method.

BACKGROUND TECHNOLOGY

In the nail gun market, nail gun both belongs to the professional class of tools at the same time also applies to ordinary families and individuals for simple decoration, renovation use, in the process of using the needle by giving the needle to accumulate enough potential energy after the release of the needle, the needle instantly hit nails into the wood and other objects, to ensure that the needle in the accumulation of potential energy in the accumulation of enough accurate movement, after the completion of the energy storage and release of the needle, the needle can be no obstacles to hit nails into the wood board and other objects, each time After pulling the trigger can accurately cycle the process, and the process of hitting nails in a variety of factors affecting the effect of hitting nails and even damage to the nail gun (nail jam, wood has a knot, too hard, there are foreign objects, such as broken nails inside, etc., or hit the bias, hitting the stone and other hard objects above), they are intelligent identification, protection of the nail gun, to ensure that the nail gun is not damaged, the nail gun can be the key to long-term normal work.

SUMMARY OF THE INVENTION

The purpose of the present invention is to overcome the shortcomings of the existing technology, and to provide a nail gun needle intelligent identification mechanism and identification method, to ensure that the needle in the accumulation of sufficient potential energy in the accurate movement, energy storage is completed after the release of the needle, the needle can be no obstacles to hit the nails into the board and other objects, and the process of hitting nails in a variety of impact on the nail hitting effect or even damage to the nail gun factors (nail jamming, the wood has a knot, too hard, inside there are Foreign objects, such as broken nails in the inside, etc., or hit the bias, hit in the stone and other hard objects above), they are intelligent identification, protection of the nail gun, to ensure that the nail gun is not damaged. The object of the present invention is accomplished by the following technical solution: this method of intelligent recognition of a nail gun punch pin performs or recognizes the following four working conditions:

normal operation, including the following processes:

S1, the punch needle is in the initial position, the motor stops, the punch needle rests on the cam pin of the punch needle drive cam, and the punch needle drive cam does not rotate under the action of the unidirectional bearing, so that the accumulator body maintains energy storage;

S2, pull the trigger, the motor drives the punch drive cam to rotate counterclockwise, instantly disengaging the punch teeth and releasing the accumulator so that the punch pushes the nail downward at high speed;

S3, the punch needle moves downward until the inductive photocoupler passes through the photocoupler sensing notch and enters the inductive photocoupler blocking edge, the inductive photocoupler sends a blocking signal to the control circuit, the control motor stops, and the punch needle drive cam stops thereupon;

S4, the clutch pawl crosses the mating notch on the punch needle and the punch needle continues to move downward;

S5, the piston fixing the punch needle begins to contact the cushion, at which time the identification hole on the punch needle is exactly aligned with the inductive photocoupler, so that the inductive photocoupler sends the first in place signal to the control circuit;

S6, the piston contacts the cushion, compresses the cushion, and continues to move downward for a distance and then stops moving downward, at which time the punch needle is in a fully released position, and the recognition hole crosses over the inductive photocoupler, so that the inductive photocoupler continues to be inductive photocoupler blocking along the blocking, and sends a second in-place signal to the control circuit;

S7, the buffer pad springs back and resets to a state in which the piston and the buffer pad are just in contact, at which time the identification hole is again aligned with the inductive photocoupler so that the inductive photocoupler sends a third in-place signal to the control circuit;

S8, after the control circuit receives said third in place signal, the control motor is started and thereupon begins to drive the punch drive cam to rotate counterclockwise so that the cam pin begins to engage the punch teeth;

S9, the punch drive cam rotates counterclockwise for one week, and then disengages the punch teeth, at which time the clutch pawl is exactly stuck into the mating notch, locking the punch needle from downward movement;

S10, the punch needle drive cam continues to rotate counterclockwise, engages the punch needle teeth again, and drives the punch needle upward until the inductive photocoupler passes through the photocoupler sensing notch and leaves the inductive photocoupler blocking edge, sends an unobstructed signal to the control circuit, and the motor starts braking and stopping to stop the punch needle drive cam to the initial position;

Assembly fault: nail gun assembly is complete, turn on the power supply, start the implementation of normal operation under the process of S8, S9, S10, so that the needle back to the initial position, if there is an assembly problem or parts problem, the identification hole will not be able to align the inductive photocoupler, that is, the control circuit did not receive the third in place signal, the motor does not rotate, the nail gun cannot work properly, at this time the nail gun sends out an alarm, prompting the need for maintenance;

Nail stuck punch needle: nail gun normal work, in the process S3 or process S4 interruption, at this time, the punch needle drive cam stops turning and completely disengaged from the punch needle teeth, the inductive photocoupler cannot be identified through the recognition of the hole to the control circuit to send the subsequent complete first in place signal, the second in place signal, as well as the third in place signal, the motor does not work, the punch drive cam to keep the non-rotation of the nail gun cannot work properly, issued by the nail stuck signals. Tip card nail;

Rebound failure: Nail gun normal work, in the process of S6 interruption, at this time, the needle drive cam stops rotating and completely disengaged from the needle teeth, but in the sense of the photocoupler issued the first and second in place signal, the piston cannot be rebound, the sense of the photocoupler did not send a third in place signal to the control circuit, the motor does not work, the needle drive cam to maintain the non-rotation of the nail gun cannot work properly, at this time, the nail gun sends out an alarm, prompting the need for maintenance.

As a further technical solution, in the case of said nail jamming the punching needle, the power is turned off, the jammed nail is removed, the punching needle returns to the state of process S5, the power is turned on, the reset mode is turned on, the trigger is pressed, and the nail gun starts working from the process S8 to return to normal to ensure that the punching needle drive cam acts only when the punching needle returns to the position of correctly engaging with the punching needle drive cam.

As a further technical solution, under the said rebound failure condition, the control circuit will not give a signal to the motor to rotate, and the punch driving cam will not rotate, so as to avoid the punch driving cam colliding with the punch teeth and damaging other parts.

A nail gun punch pin intelligent identification mechanism, set in a nail gun housing for realizing the abovementioned nail gun punch pin intelligent identification method, said nail gun housing is fixed with a nail clip, an assembly rack body and an accumulator body, the nail clip is set below the assembly rack body for feeding nails into the assembly rack body, the accumulator body is set at the rear of the assembly rack body, and a motor is set in the nail gun housing for driving the punch pin to drive the cam to rotate;

The assembly frame body is slidingly provided with a punching needle, the fixed end of the punching needle is fixed on the piston of the accumulator, and the movable end of the punching needle is slidingly provided in the assembly frame body for hitting the nails in the assembly frame body; the said punching needle driving cam and the clutch pawl are provided on both sides of the punching needle, and the punching needle is equipped with punching needle teeth at the edges of the side of the punching needle towards the punching needle driving cam, and a number of cam pins are provided on the punching needle driving cam, and the punching needle driving cam engages and drives the punching needle between initial position and full release position by the cam pins. The needle drive cam is provided with a number of cam pins through which the needle drive cam engages with the needle teeth to drive the needle to slide between an initial position and a fully released position;

An inductive photocoupler blocking edge is provided at the edge of the punch needle toward the clutch pawl side for selectively blocking the inductive photocoupler provided next to the clutch pawl, and the inductive photocoupler is controlled using a control circuit for motor communication;

In the induction photocoupler blocking edge in turn with photocoupler sensing notch, fit notch and identification holes, when the photocoupler sensing notch passes through the induction photocoupler, the induction photocoupler sends a signal to the control circuit to block or not block, control the motor to stop; the fit notch, used to fit the clutch pawl into the clutch pawl, with the fit notch near the movable end of the side of the inductive photocoupler blocking edge with the left jump platform, with the fit notch near the fixed end of the side of the inductive Photocoupler blocking edge is provided with a right jump platform, and the height of the left jump platform is greater than the right jump platform; when the clutch pawl leaves the left jump platform to match the gap movement, the clutch pawl is an arc trajectory over the matching gap and falls on the right jump platform; the lower mouth of the accumulator body is equipped with a cushion, used to provide a rebound force to the piston, when the piston downward movement to just with the buffer cushion contact, the identification holes on the punching needle is just right to the induction photocoupler.

As a further technical solution, said assembly frame body includes an upper plate and a lower plate, and a punch needle is slidably provided between the upper plate and the lower plate; the upper surface of the lower plate is provided with a tab for cooperating with a groove provided on the lower surface of the punch needle, and the punch needle slides along the tab to realize guiding; the lower surface of the lower plate is provided with a nail entry port, and the nail entry port penetrates the tab, so that nails at the top of the said nail clamps enter into the assembly frame body along the nail entry port.

As a further technical solution, when said punch needle slides into an intermediate energy storage position between the initial position and the energy storage position, the cam pin of said punch needle drive cam is just disengaged from the punch needle teeth and said clutch pawl is just seated in the notch, thereby restricting the movement of the punch needle towards its movable end.

As a further technical solution, said motor is connected to a drive camshaft through a gearbox, and the camshaft is set with a one-way bearing, thus driving the punch needle to drive the cam to rotate unidirectionally.

As a further technical solution, said accumulator is a spring or a compressed gas. The beneficial effects of the present invention are:

1, in the opening of the identification hole on the punch, with the inductive photocoupler can continuously get three in place signal, and then use the control circuit of the motor communication control, so as to identify the normal operation, assembly failure, nails stuck in the punch needle and rebound failure of four kinds of conditions, and according to the conditions to send out the corresponding alarm signals;
2, the needle drive cam only when the needle back to the needle drive cam and the needle drive cam correctly engaged position before the action, to avoid the drive cam and the needle teeth are not correctly engaged leading to action disorder or even collision, damage to parts and components, and thus extend the service life of the nail gun;
3, the emergence of jammed nails or wood has a knot, too hard, there is a foreign body inside the working conditions, the drive cam stops and completely disengaged from the teeth of the punch needle, the punch needle is no longer in action, to be jammed nails out of the normal mode of operation can be entered into, to protect the nail gun, to ensure that the nail gun is not damaged.

Figure 1:
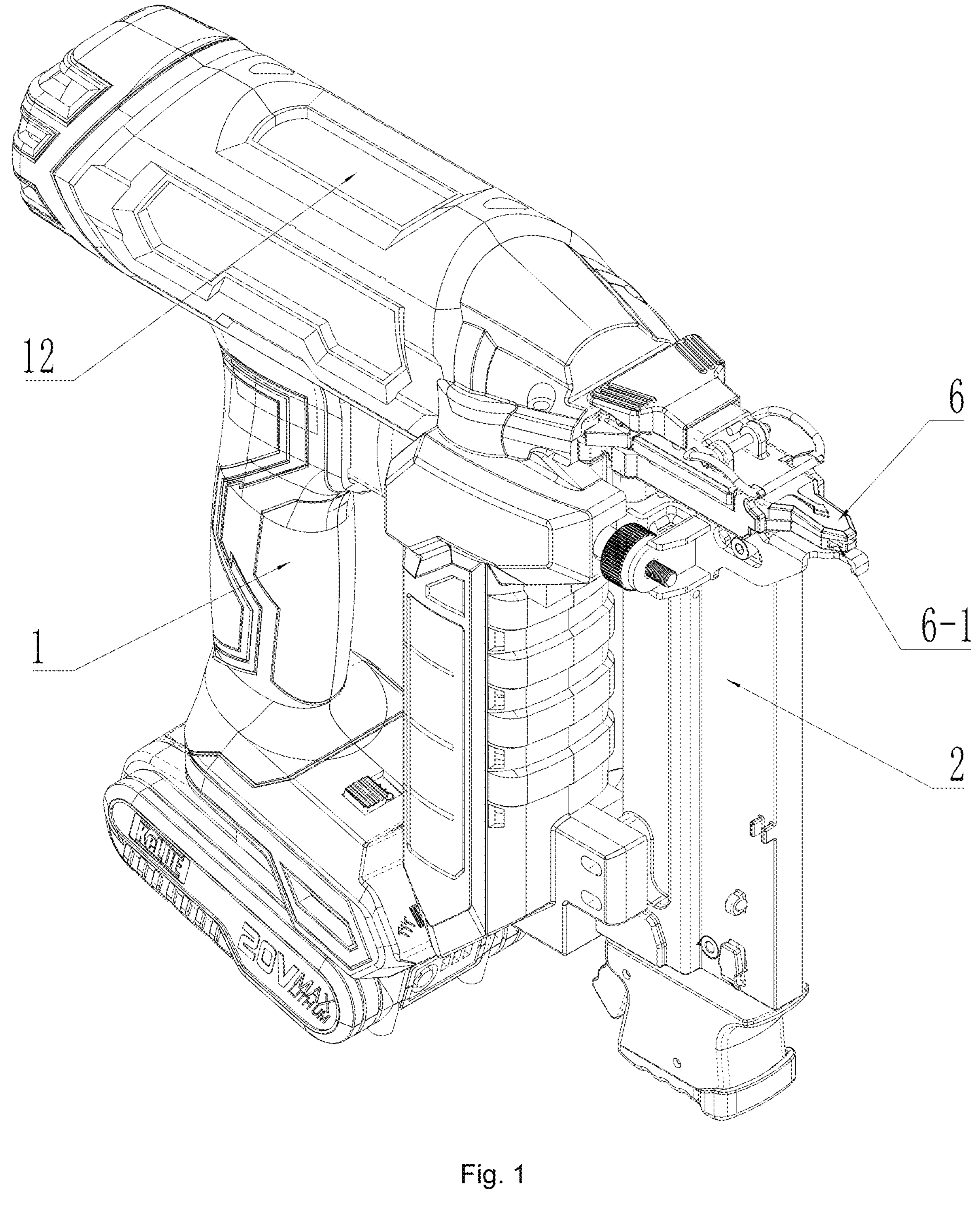
FIG. 1 shows a schematic diagram of the three-dimensional structure of the present invention.

Indication of the accompanying reference signs: nail gun housing 1, nail clip 2, motor 3, gear box 4, one-way bearing 5, assembly rack body 6, nail outlet 6-1, upper plate 6-2, lower plate 6-3, cam 6-4, nail inlet 6-5, punch driving cam 7, sensing photocoupler 8, torsion spring 9, clutching pawl 10, punch needle 11, fixed end 11-1, movable end 11-2, punch needle teeth 11-3, sensing photocoupler masking edge 11-4, mating notch 11-5, notch 11-6, left jumper 11-7, right jumper 11-8, identification hole 11-9, sensing notch 11-10 for photocoupler, accumulator 12, camshaft 13, piston 14, cam pin 15, trigger 16, cushion 17.

DETAILED DESCRIPTION OF EMBODIMENTS

Figure 12:
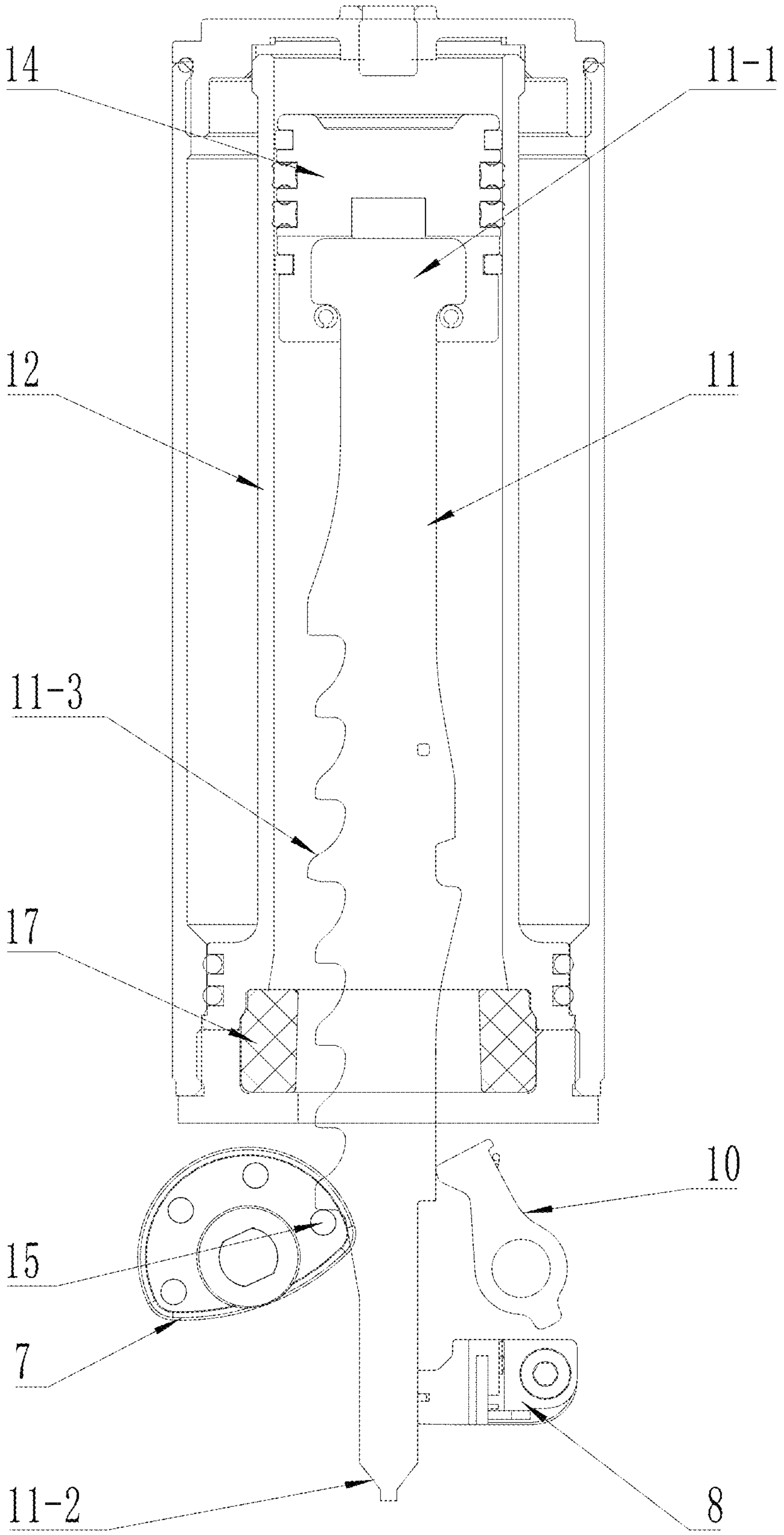
FIG. 12 shows the working process of the invention in FIG. 1 (initial position).
Figure 13:
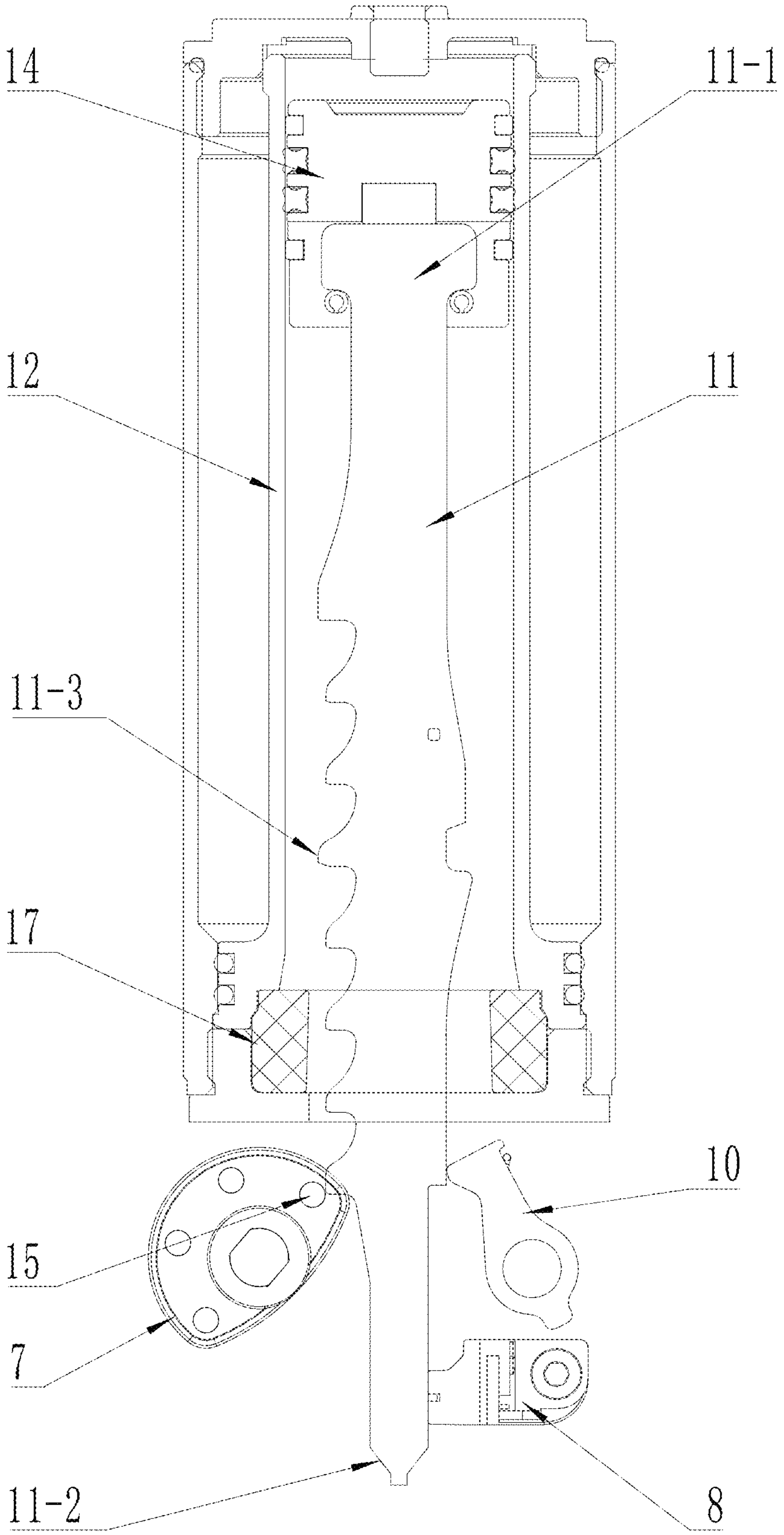
FIG. 13 shows a diagram of the working process of the present invention 2.
Figure 14:
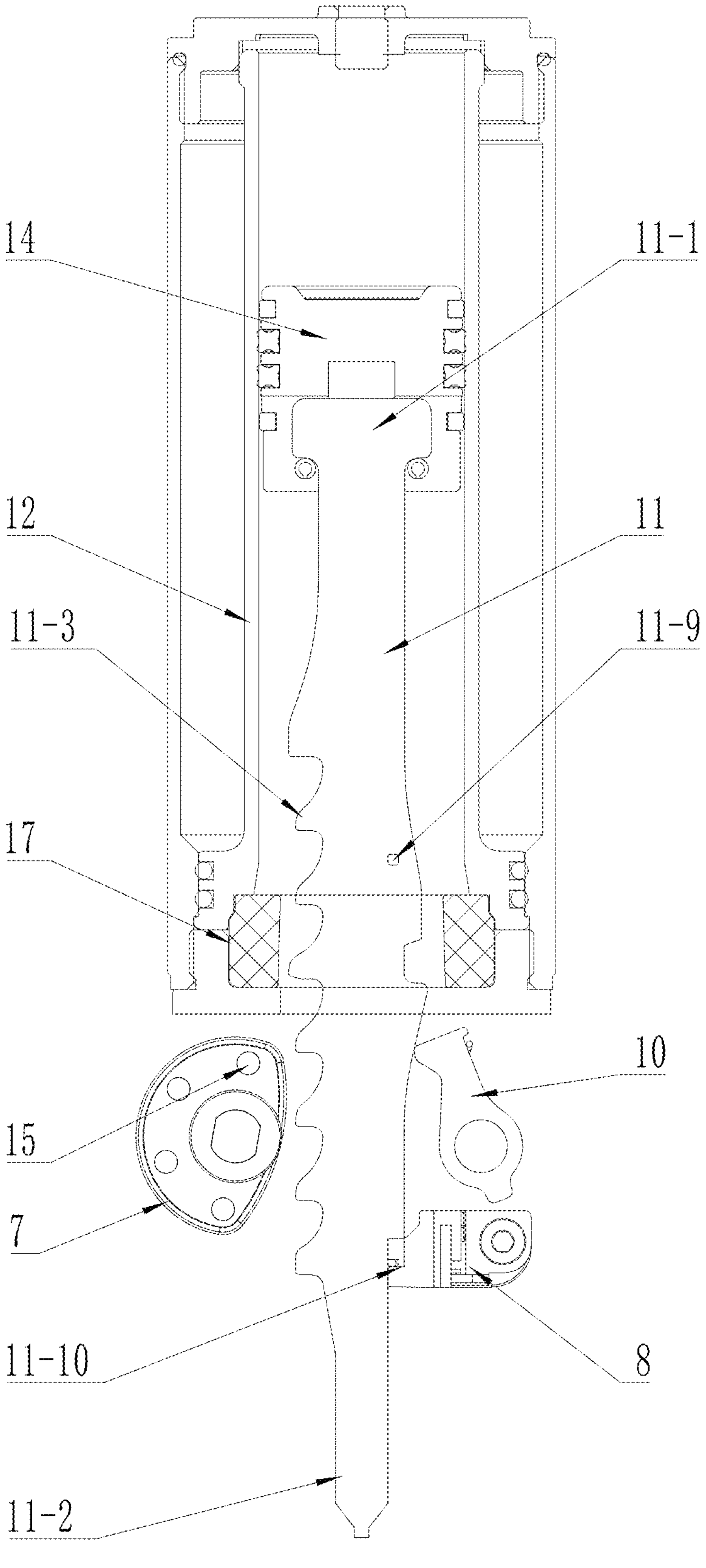
FIG. 14 shows the working process of the present invention in FIG. 3.
Figure 15:
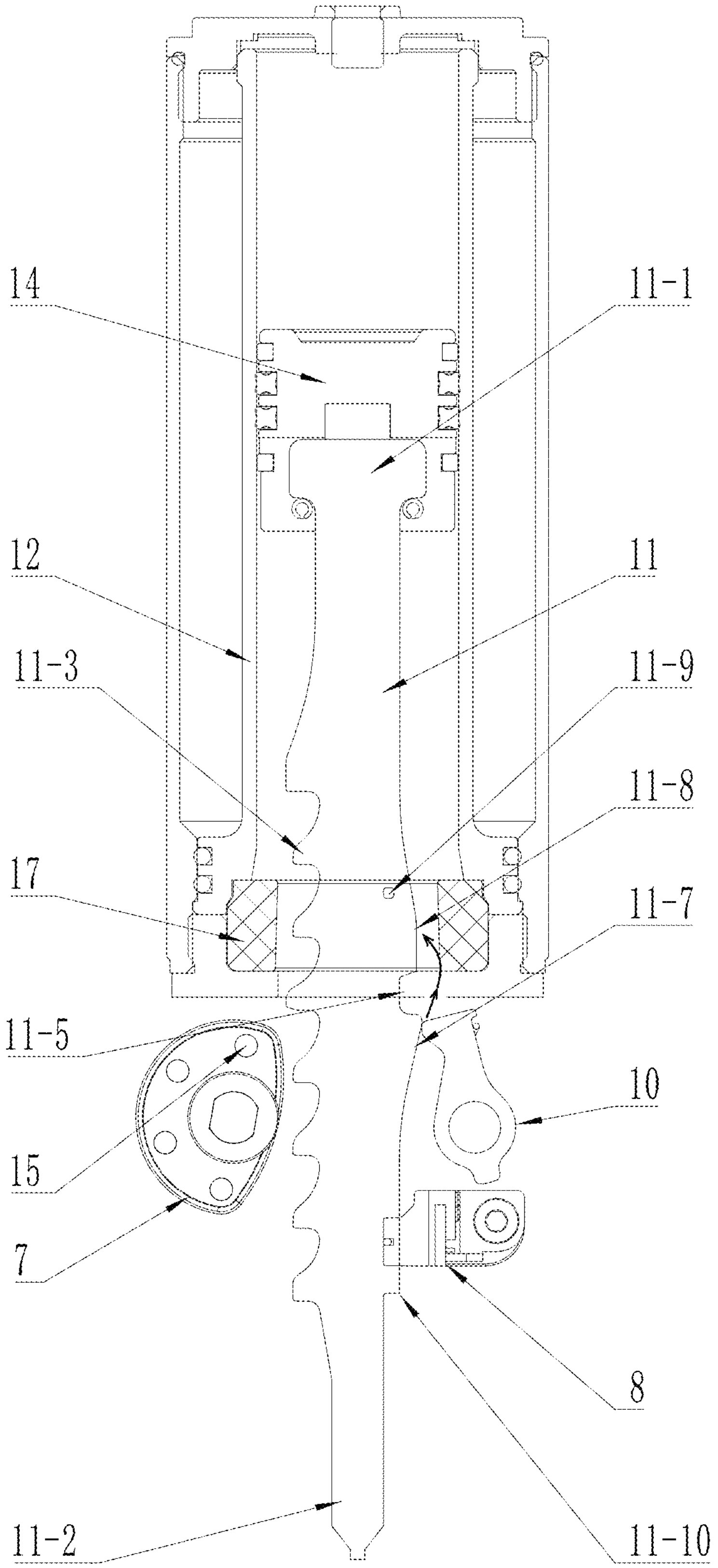
FIG. 15 shows the working process of the present invention in FIG. 4.
Figure 16:
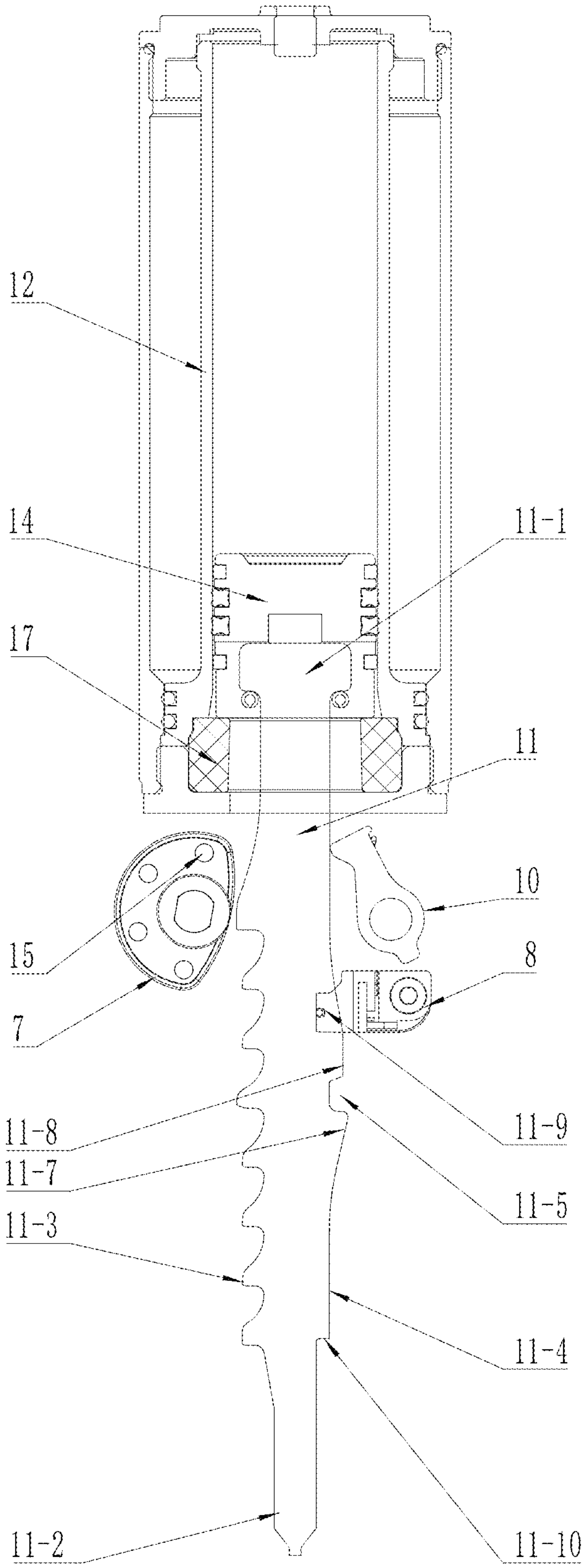
FIG. 16 shows the working process of the present invention in FIG. 5.
Figure 17:
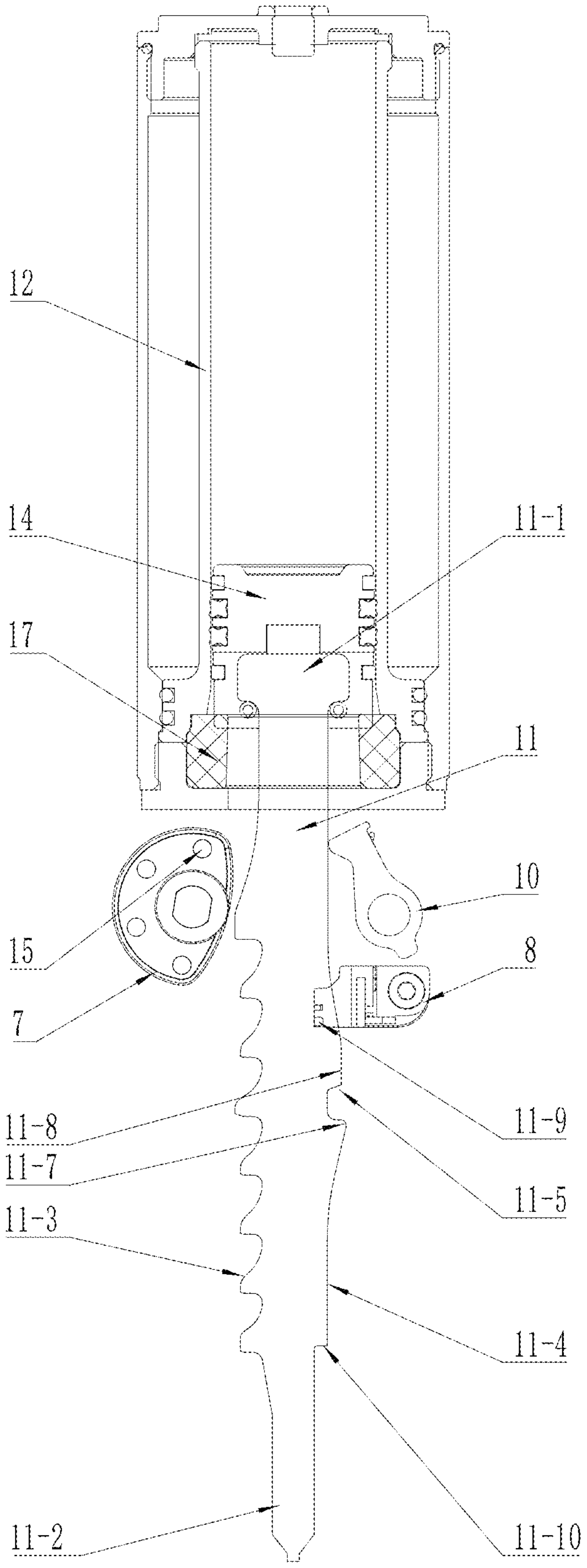
FIG. 17 shows the working process of the invention in FIG. 6 (fully released position).
Figure 18:
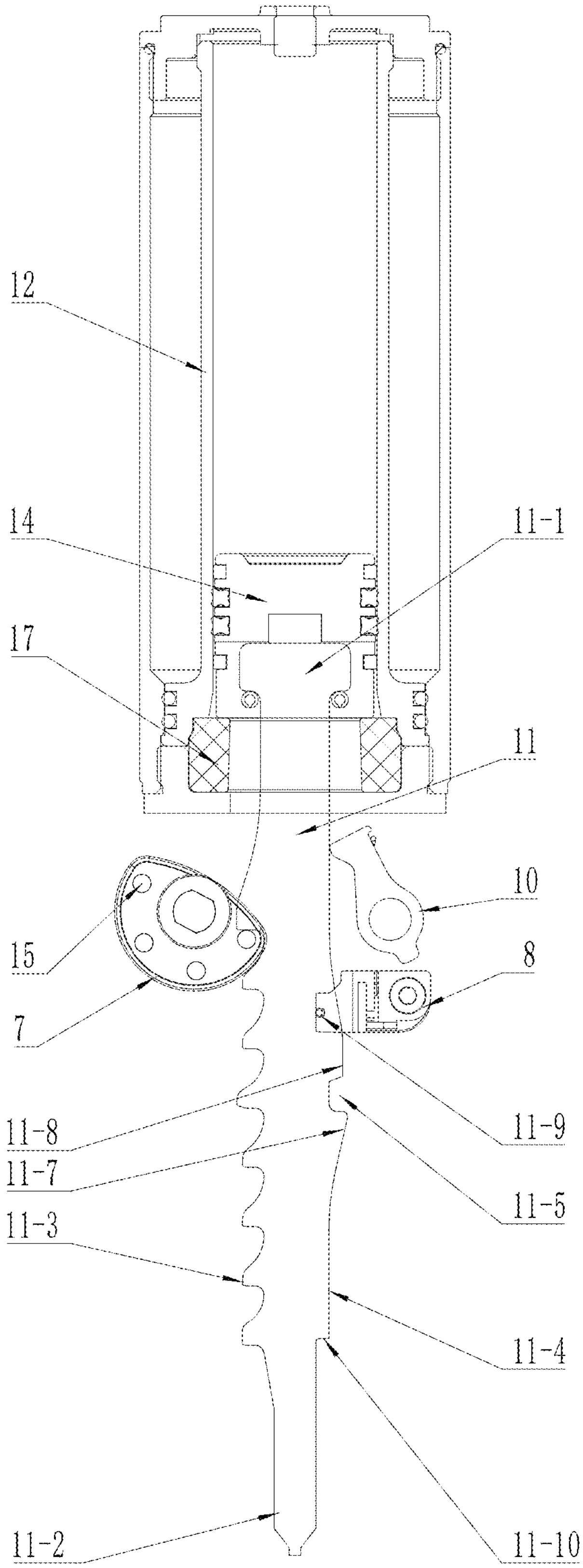
FIG. 18 shows the working process of the present invention in FIG. 7.
Figure 19:
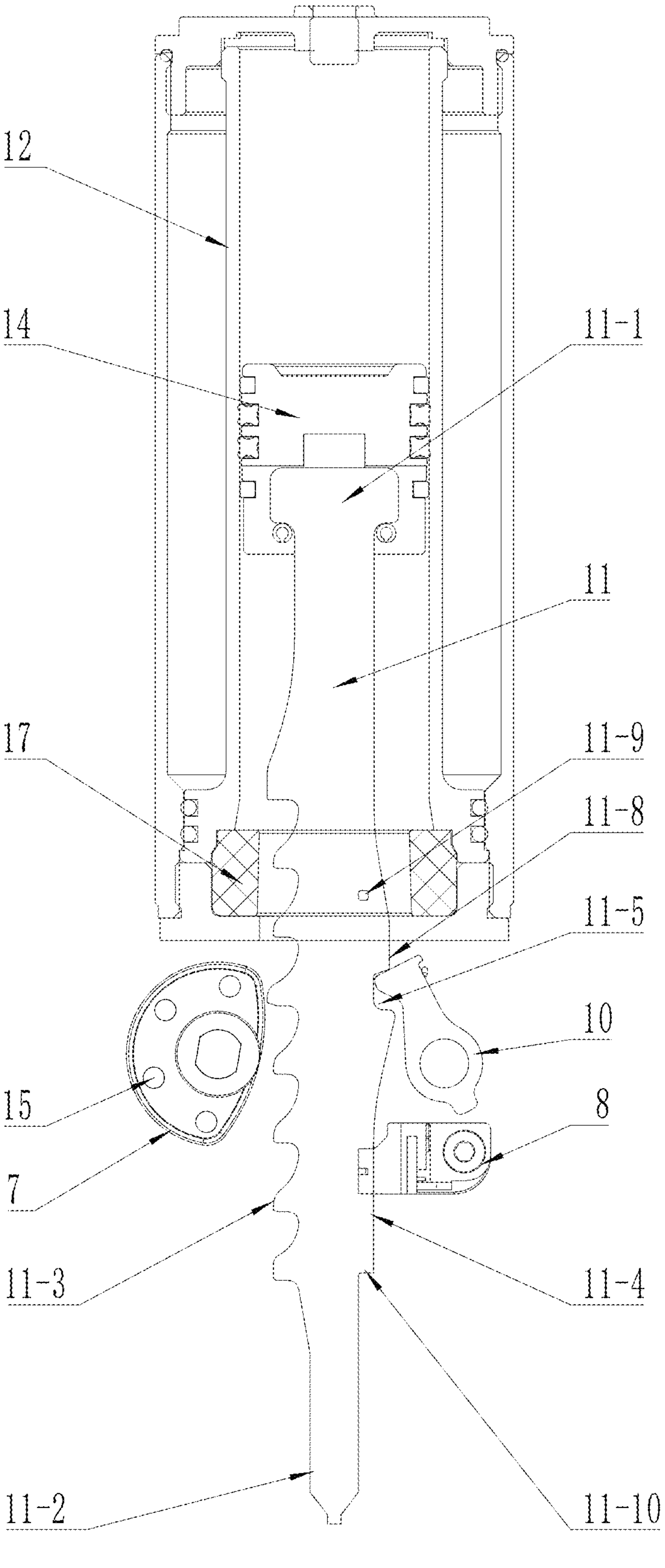
FIG. 19 shows the working process of the invention in FIG. 8 (middle energy storage position).
Figure 20:
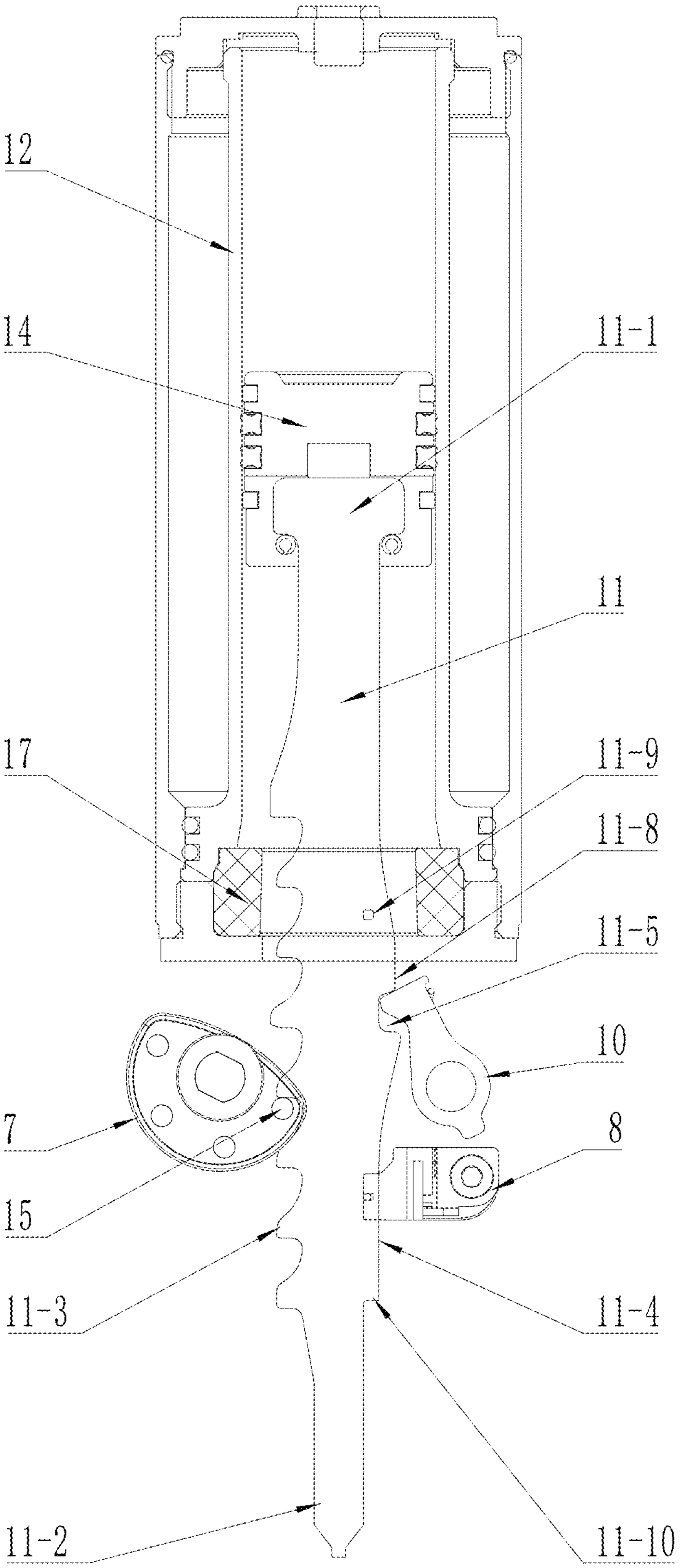
FIG. 20 shows the working process of the present invention in FIG. 9.
Figure 21:
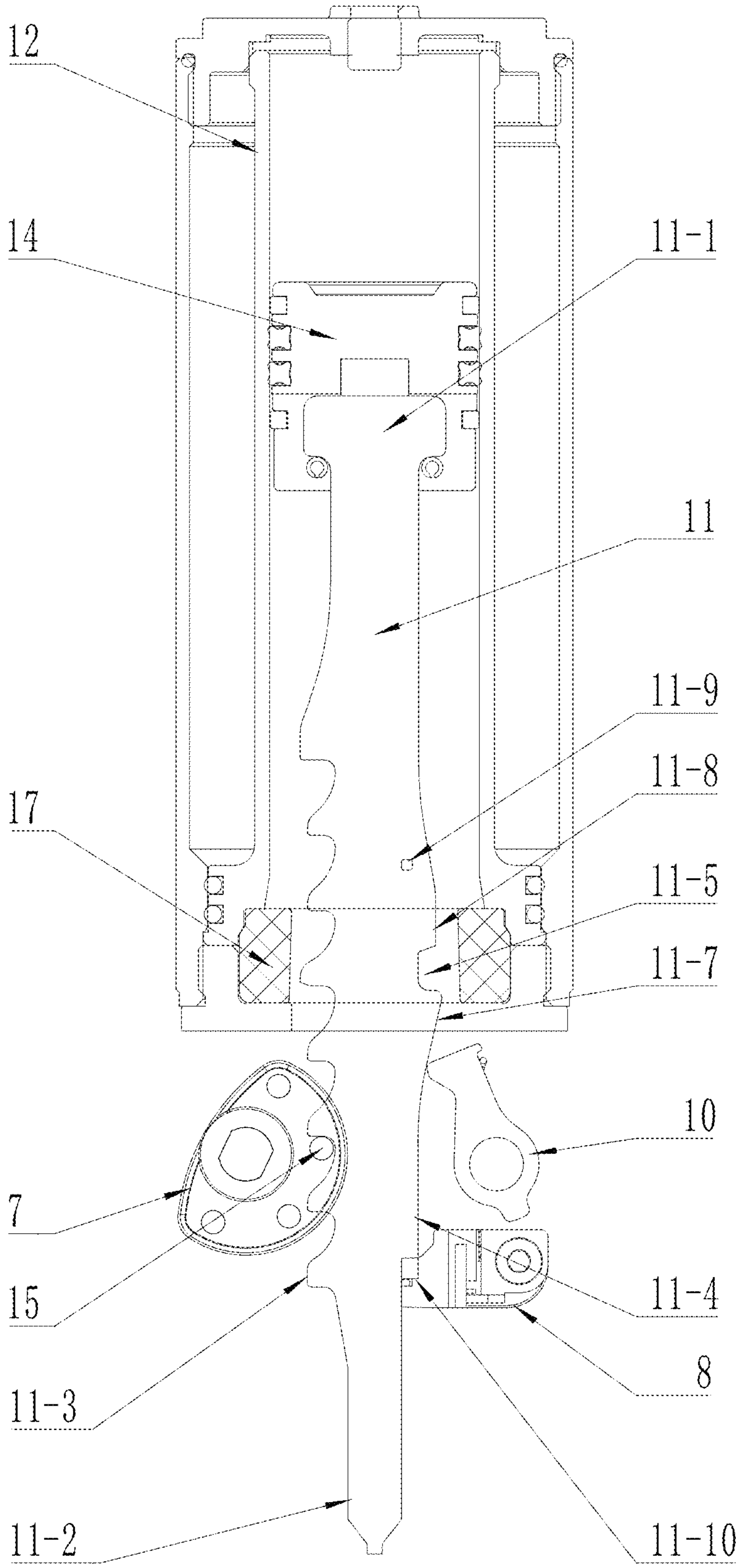
FIG. 21 shows a diagram of the working process of the present invention in FIG. 10.

The invention will be described in detail below in conjunction with the accompanying drawings:

EXAMPLE: As shown in the accompanying FIGS. 1 to 21, this method of intelligent recognition of nail gun punches is used to perform or recognize the following four working conditions:

normal operation, including the following processes:

S1, the punch needle 11 is in the initial position (as shown in FIG. 12), at which time the motor 3 stops, the punch needle 11 rests against the cam pin 15 of the punch needle drive cam 7, and the punch needle drive cam 7 does not rotate under the action of the one-way bearing 5, so that the energy accumulator body 12 maintains the energy accumulation;

S2, pulling the trigger 16, the motor 3 drives the punch drive cam 7 to rotate counterclockwise, instantly disengaging the punch teeth 11-3, as shown in FIG. 13, at which time the accumulator 12 is released, so that the punch pin 11 pushes the nail downward at high speed;

S3, the punch needle 11 moves downward until the inductive photocoupler 8 passes through the photocoupler sensing notch 11-10 and then enters the inductive photocoupler masking along 11-4, as shown in FIG. 14, at which time the inductive photocoupler 8 sends a masking signal to the control circuit, the control motor 3 stops, and the punch needle drive cam 7 then stops;

S4, as shown in FIG. 15, the clutch pawl 10 crosses the mating notch 11-5 on the punch 11 along the trajectory indicated by the arrow in the figure, and the punch 11 continues to move downward;

S5, the piston 14 holding the punch needle 11 begins to contact the cushion 17, as shown in FIG. 16, at which time the identification holes 11-9 on the punch needle 11 are precisely aligned with the inductive optocoupler 8, so that the inductive optocoupler 8 sends a first in-place signal to the control circuit;

S6, the piston 14 contacts the cushion 17, compresses the cushion 17, continues to travel downward for a certain distance and then stops moving downward, at which time the punch needle 11 is in a fully released position, and as shown in FIG. 17, the identification hole 11-9 crosses the inductive optocoupler 8, so that the inductive optocoupler 8 continues to be covered by the inductive optocoupler blocking along the 11-4, and sends a second in-place signal to the control circuit;

S7, the cushion 17 springs back and resets to a state in which the piston 14 is just in contact with the cushion 17, as shown in FIG. 16, at which time the identification holes 11-9 are again aligned with the inductive optocoupler 8 so that the inductive optocoupler 8 sends a third in-place signal to the control circuit;

S8, after the control circuit receives said third in-place signal, the control motor 3 is started and thereupon begins to drive the punch drive cam 7 to rotate counterclockwise so that the cam pin 15 begins to engage the punch teeth 11-3, as shown in FIG. 18;

S9, the punch drive cam 7 rotates counterclockwise for one week and then disengages from the punch teeth 11-3, as shown in FIG. 19, at which time the clutch pawl 10 snaps into the mating notch 11-5 exactly, locking the punch 11 from downward movement;

S10, the punch drive cam 7 continues to rotate counterclockwise, engaging the punch teeth 11-3 again, as shown in FIG. 20, driving the punch 11 upward until the inductive optocoupler 8 passes through the optocoupler sensing notch 11-10 and then leaves the inductive optocoupler blocking along 11-4, as shown in FIG. 21, and the inductive optocoupler 8 sends an uncovered signal to the control circuit, and the motor 3 starts braking and stopping to park the punch drive cam 7 to the initial position;

Nail gun performs S1-S10 cycle during normal nailing, but when various factors affecting the nailing effect or even destroying the nail gun appear in the process of nailing (nail jamming, knotting wood, too hard, foreign objects inside, such as broken nails inside, etc., or hitting deviation, hitting the top of the stone and other hard objects), the intelligent recognition mechanism and method of the punch needle with recognition holes can intelligently recognize and dispose of the abnormality caused by the unfavorable factors, thus protecting the nail gun from being damaged. The pin can intelligently recognize and dispose of the abnormality caused by various unfavorable factors, so that the nail gun can be protected from damage.

Assembly failure: nail gun assembly is complete, turn on the power supply, start the implementation of normal operation under the process S8, S9, S10, so that the punch needle 11 back to the initial position, if there are assembly problems or parts problems, identification holes 11-9 will not be able to align the induction photocoupler 8, that is, the control circuit did not receive the third in place signal, the motor 3 does not rotate, the nail gun cannot work properly, at this time the nail gun sends out an alarm, suggesting that need to be repaired;

Nail stuck punch needle: for example, the wood has knots, too hard, there are foreign objects inside, such as broken inside the nail, etc., or hit the bias, hit on top of the stone and other hard objects resulting in nails do not go to the bottom, etc., there will be nails stuck punch needle 11, so that the normal work of the nail gun, in the process of S3 or the process of S4 interruptions, at this time, the needle drive cam 7 stops rotating and completely disengaged from the pin teeth 11-3, the inductive optocoupler 8 cannot be through the identification hole 11-9 to the control circuit to send a subsequent complete first in place signal, a second in place signal, and a third in place signal, the motor 3 does not work, the punch needle driving cam 7 remains non-rotating, the nail gun cannot work normally, and a nail jam signal is sent to signal the nail jam. Preferably, under the working condition of the nail jamming the punch needle, the power supply is turned off, and after the jammed nail is removed, the punch needle 11 returns to the state of process S5, the power supply is turned on, the reset mode is turned on, the trigger 16 is pressed, and the nail gun starts working from the process S8 to return to normal to ensure that the punch needle drive cam 7 only operates when the punch needle 11 returns to the position of correct engagement with the punch needle drive cam 7.

Rebound failure: for example, cushion 17 broken or lost compression rebound ability, punch needle 11 in the piston 14 fixed loose or broken, making the nail gun normal work in the process S6 interruption, at this time, the punch needle drive cam 7 stopped and completely disengaged from the punch needle teeth 11-3, but in the sense of the photocoupler 8 issued the first and second in place signals, the piston 14 cannot be rebound, the sense of the photocoupler 8 did not send a third in place signals to the control circuit A third in-place signal is issued, the motor 3 does not work, the punch needle drive cam 7 remains non-rotating, and the nail gun does not work properly, at which time the nail gun issues an alarm to indicate the need for maintenance. Preferably, in the rebound failure condition, the control circuit will not give the motor 3 rotation signal, the needle drive cam 7 will not rotate, to avoid the needle drive cam 7 and the needle teeth 11-3 collision and damage to other parts.

Referring to the attached FIGS. 1 to 11, a nail gun punch pin intelligent identification mechanism for realizing the above nail gun punch pin intelligent identification method is provided in a nail gun housing 1, which includes a nail gun housing 1, a nail clamp 2, a motor 3, a gear box 4, a one-way bearing 5, an assembly rack body 6, a nail outlet 6-1, an upper plate 6-2, a lower plate 6-3, a cam 6-4, a nail inlet 6-5, a punch pin driving cam 7, an inductive light coupling 8, a torsion spring 9, clutch pawl 10, punch pin 11, fixed end 11-1, movable end 11-2, punch pin teeth 11-3, inductive photocoupler shading edge 11-4, mating notch 11-5, notch 11-6, left jumper table 11-7, right jumper table 11-8, identification hole 11-9, photocoupler inductive notch 11-10, accumulator body 12, cam shaft 13, piston 14, cam pin 15, trigger 16 and a cushion 17.

Figure 2:
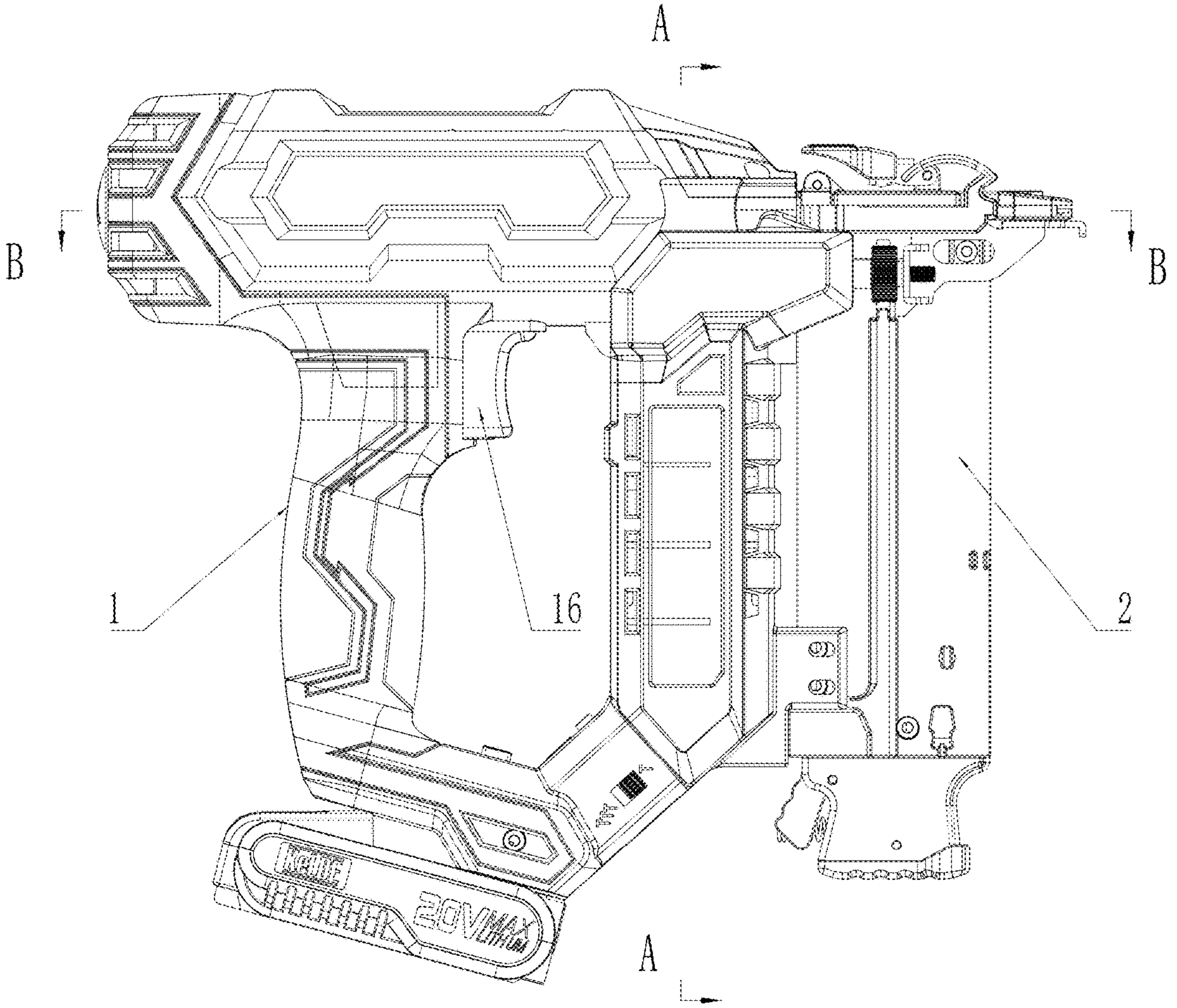
FIG. 2 shows a schematic diagram of the main view structure of the present invention.
Figure 3:
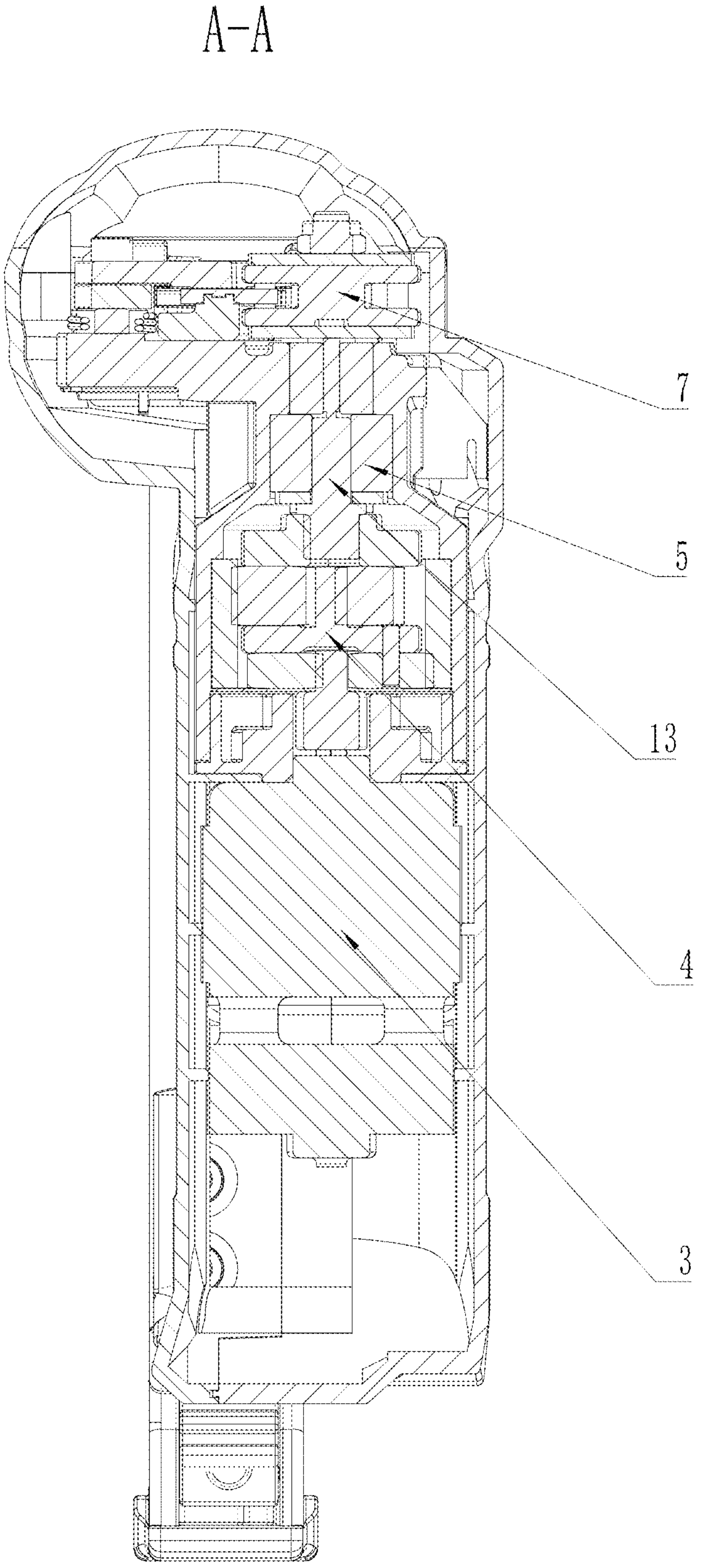
FIG. 3 shows an A-A sectional view of FIG. 2.

As shown in FIGS. 1, 2, a nail clip 2, an assembly frame body 6 and an accumulator 12 are fixed to the nail gun housing 1. The nail clip 2 is provided below the assembly frame body 6 for feeding nails into the assembly frame body 6, and the accumulator 12 is provided at the rear of the assembly frame body 6. Referring to the accompanying FIGS. 2 and 3, the nail gun housing 1 is provided with a motor 3, the motor 3 is triggered to rotate by a trigger 16 on the nail gun housing 1, the motor 3 is connected to a drive camshaft 13 via a gearbox 4, and the camshaft 13 is used to rotate a punch drive cam 7. Preferably, the camshaft 13 is provided with a one-way bearing 5 to ensure that the needle drive cam 7 can only rotate in one direction (counterclockwise in FIG. 4).

Figure 4:
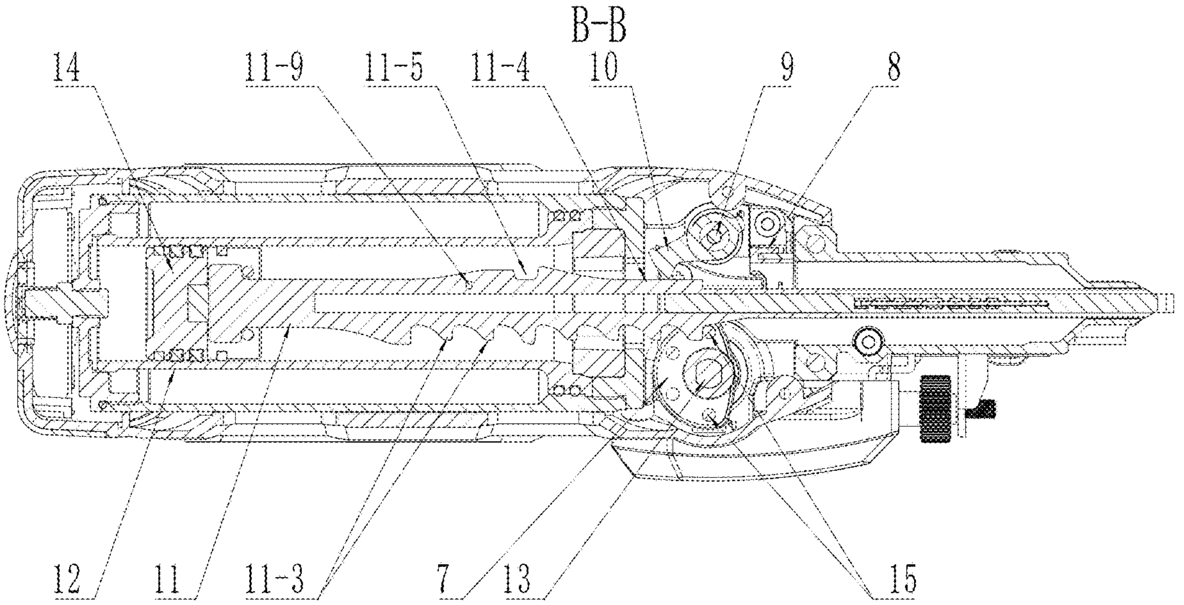
FIG. 4 shows a B-B sectional view of FIG. 2.
Figure 5:
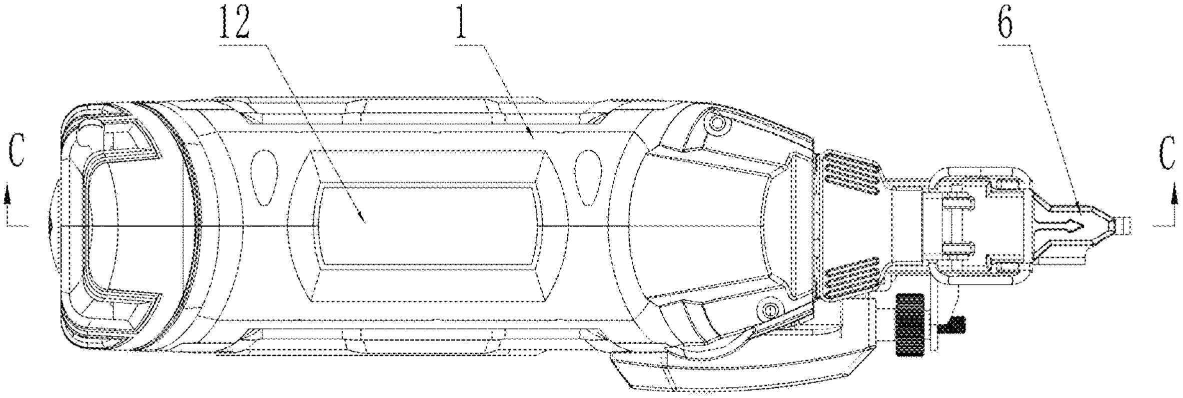
FIG. 5 shows a schematic diagram of a top view structure of the present invention.
Figure 6:
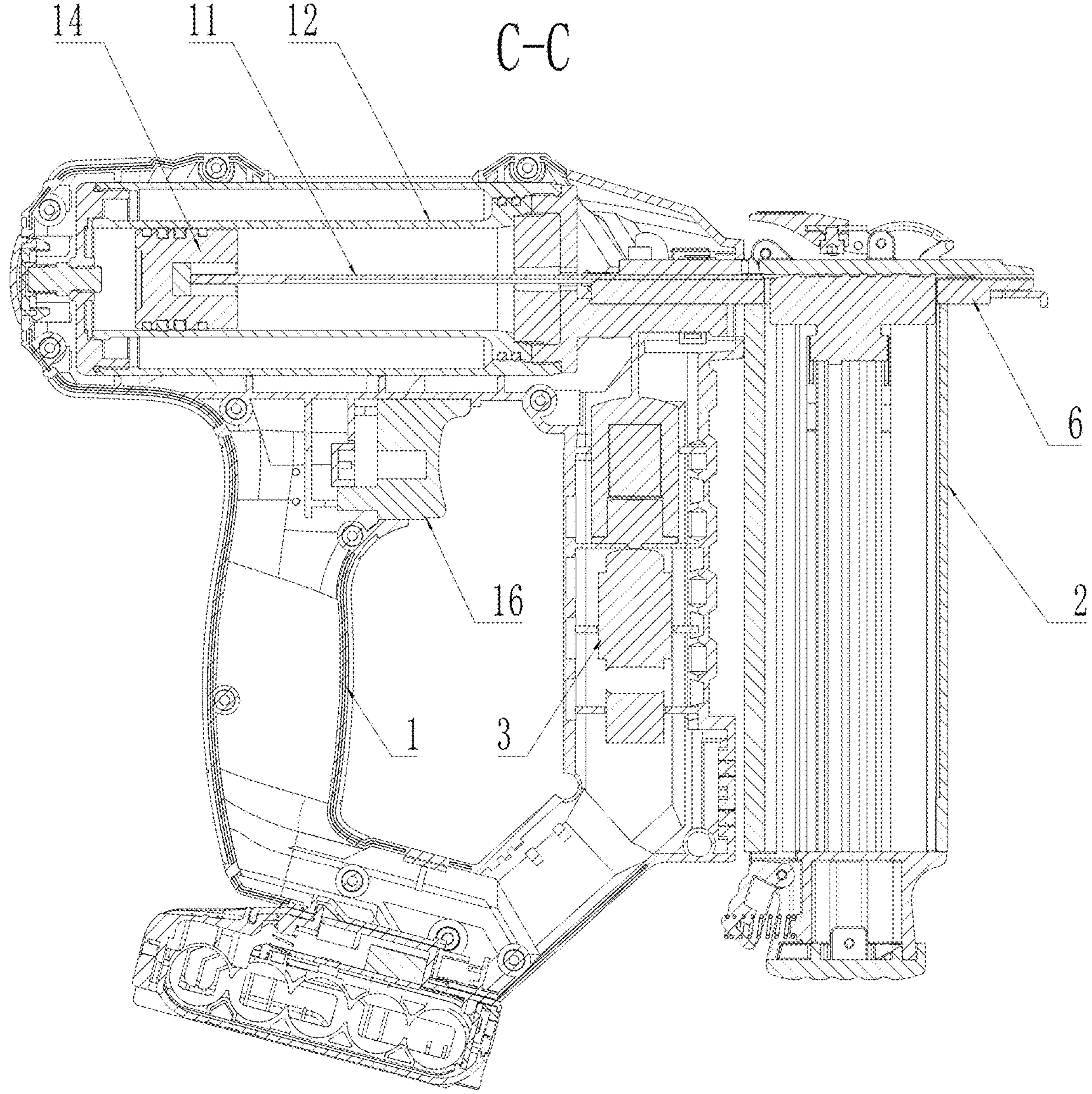
FIG. 6 shows a C-C sectional view of FIG. 5.
Figure 10:
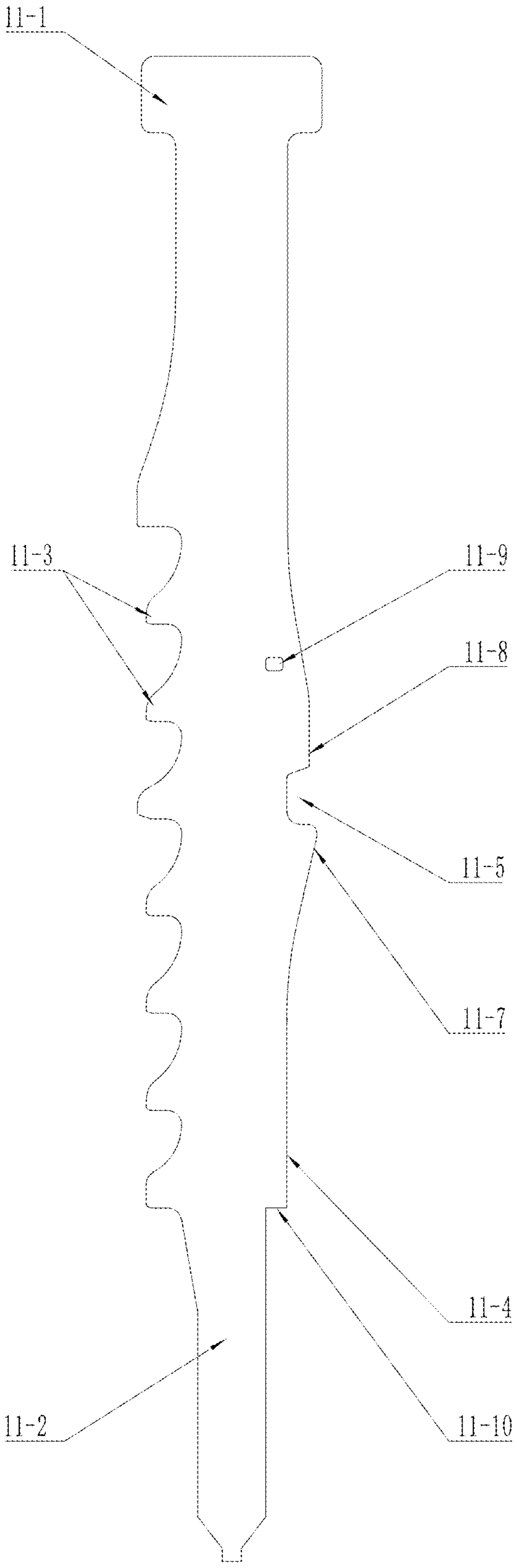
FIG. 10 shows a main view of the structure of a punch needle in the present invention.
Figure 11:
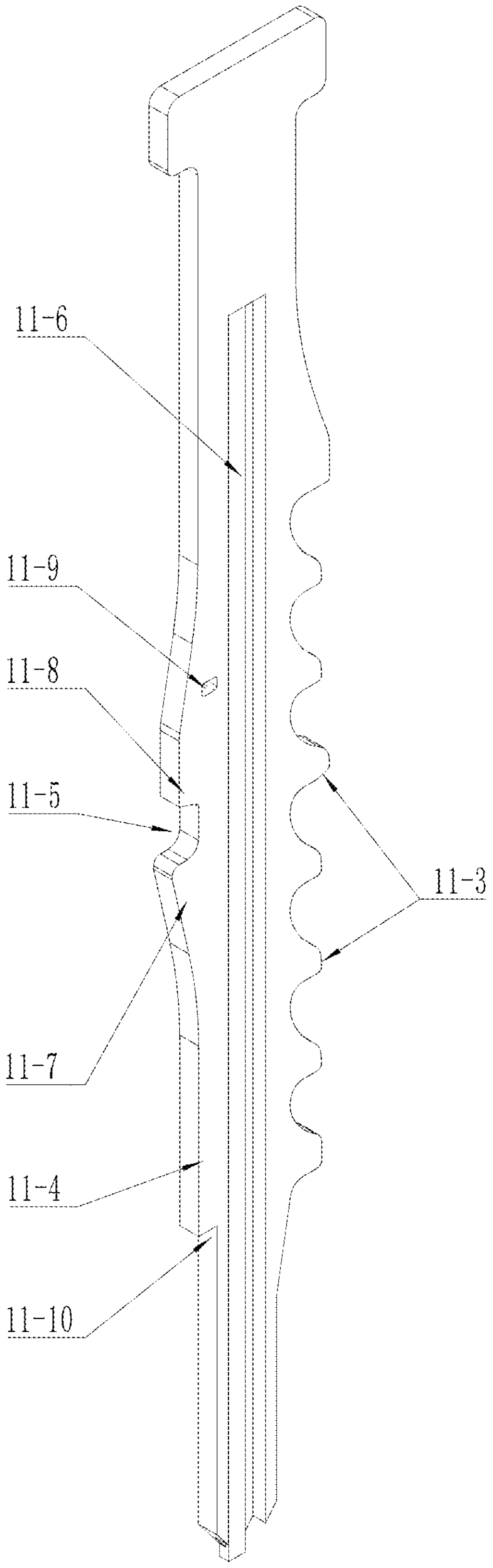
FIG. 11 shows a three-dimensional view of the structure of a punch needle in the present invention.

As shown in FIGS. 4, 10, and 11, the punch needle 11 is slidably provided in the assembly rack body 6, the fixed end 11-1 of the punch needle 11 is fixed to the piston 14 of the accumulator 12, and the movable end 11-2 of the punch needle 11 is slidably provided in the assembly rack body 6 for striking the nails inside the assembly rack body 6, so as to cause the nails to be shot out of the nail outlet 6-1 of the assembly rack body 6. The punch driving cam 7 and the clutch pawl 10 are provided on both sides of the punch needle 11, and with reference to FIGS. 10 and 11 of the accompanying drawings, the punch needle 11 is provided with punch teeth 11-3 at the edge of the side of the punch needle 11 facing the punch driving cam 7, and the punch driving cam 7 is provided with a number of cam pins 15 (preferably four in this embodiment), and the punch driving cam 7 is driven through the cam pins 15 by meshing and transmitting with the punch teeth 11-3, thereby driving the punch needle 11 to slip between an initial position (as shown in FIG. 12) and a fully released position (as shown in FIG. 17). The punch needle 11 is provided with an inductive photocoupler blocking edge 11-4 at the edge of the side of the punch needle 11 toward the clutch pawl 10 for selectively blocking the inductive photocoupler 8 provided next to the clutch pawl 10, which is communicatively controlled by the motor 3 using a control circuit. The photocoupler sensing notch 11-10, the mating notch 11-5, and the identification hole 11-9 are sequentially provided on the inductive photocoupler blocking edge 11-4, and when the photocoupler sensing notch 11-10 passes through the inductive photocoupler 8, the inductive photocoupler 8 sends a blocking or non-blocking signal to the control circuit to control the motor 3 to stop.

The torsion spring 9 is used to twist the clutch pawl 10 to ensure that the clutch pawl 10 always slides along the inductive photocoupler masking edge 11-4, and a mating notch 11-5 is provided on the inductive photocoupler masking edge 11-4 to matingly snap in the clutch pawl 10. As shown in FIGS. 10, 11, the mating notch 11-5 is provided with a left jumper 11-7 along the inductive photocoupler masking edge 11-4 close to the side of the movable end 11-2 and the mating notch 11-5 is provided with a right jumper 11-8 along the inductive optical coupling masking edge 11-4 near the side of the movable end 11-2 fixed end 11-1, and the height of the left jumper 11-7 is greater than that of the right jumper 11-8. As shown in FIG. 15, when the clutching pawl 10 moves away from the left jumper 11-7 toward the mating notch 11-5, the clutching pawl 10 is in an arcuate trajectory to cross over the mating notch 11-5 and land on the right jumping platform 11-8.

Figure 7:
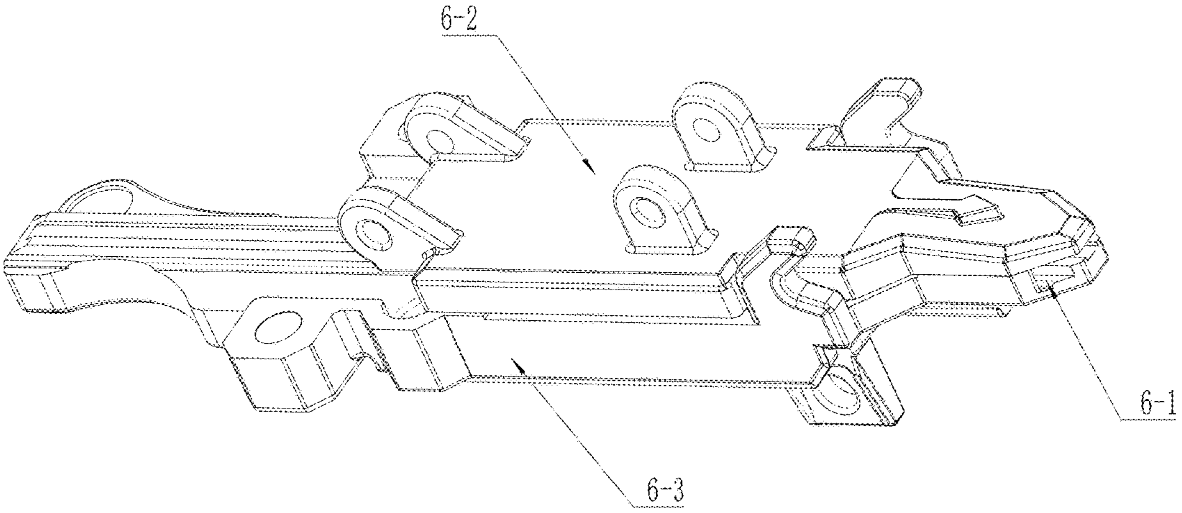
FIG. 7 shows a schematic diagram of the structure of the assembled rack body in the present invention.
Figure 8:
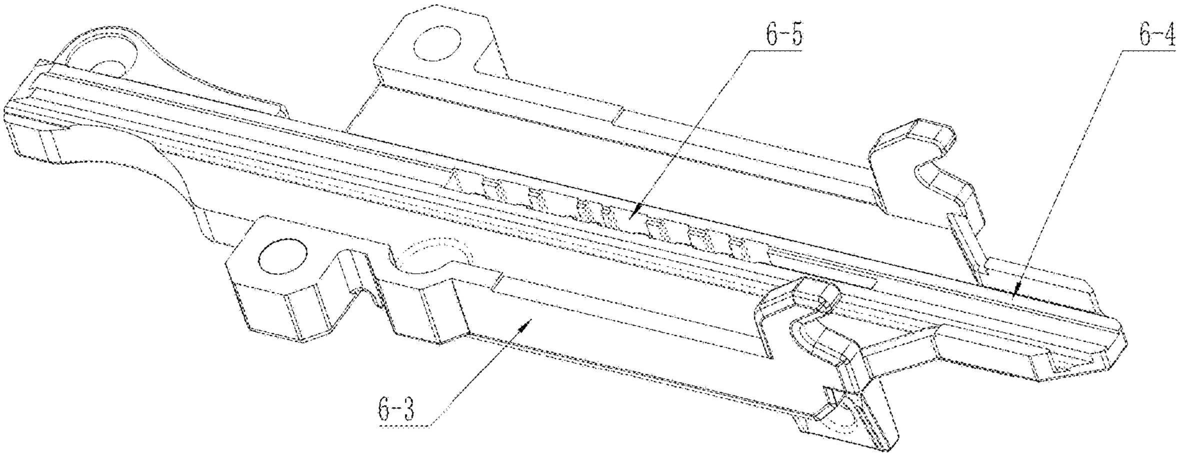
FIG. 8 shows a schematic diagram of the structure of the lower plate in the present invention.
Figure 9:
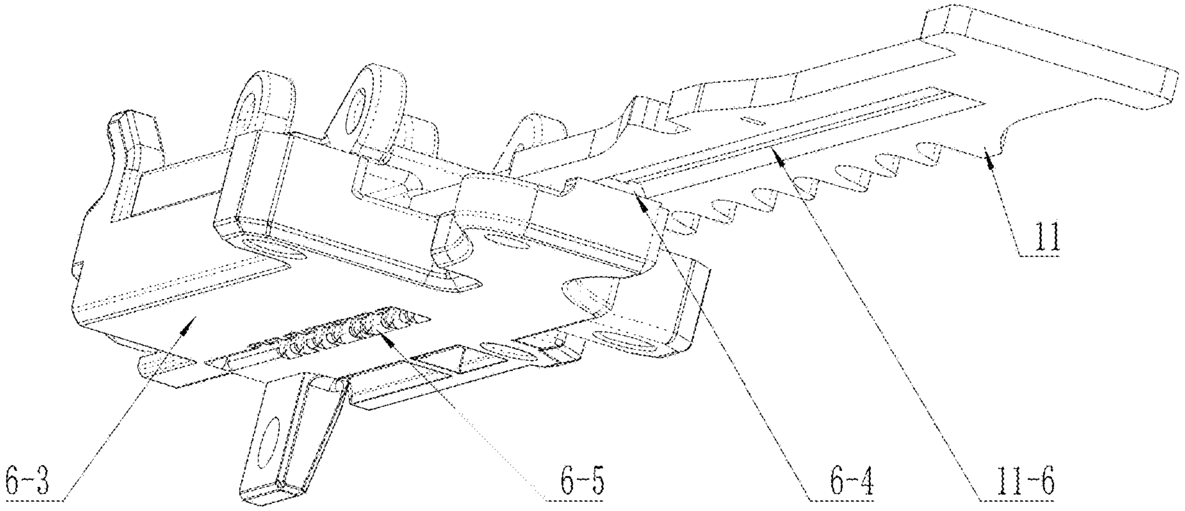
FIG. 9 shows a schematic diagram of the installation structure of the punch needle and the lower plate in the present invention.

As shown in FIG. 12, a cushion 17 is provided at the lower mouth of the accumulator 12 to provide a rebound force to the piston 14, and when the piston 14 moves downwardly until it just contacts the cushion 17, the identification holes 11-9 on the punch pin 11 are just aligned with the inductive optocoupler 8, as shown in FIG. 16. Referring to FIGS. 7 to 9 of the accompanying drawings, the assembly rack body 6 includes an upper plate 6-2 and a lower plate 6-3, and the punch needle 11 is slidably provided between the upper plate 6-2 and the lower plate 6-3. The upper surface of the lower plate 6-3 is provided with a tab 6-4 for cooperating with a recess 11-6 provided on the lower surface of the punch needle 11, and the punch needle 11 slides along the tab 6-4 to realize guidance. The lower surface of the lower plate 6-3 is provided with a nail entry port 6-5, and the nail entry port 6-5 penetrates the tab 6-4, so that the nails at the top of the nail clamp 2 enter the assembly rack body 6 along the nail entry port 6-5.

As shown in FIG. 19, when the punch needle 11 slides to the intermediate energy storage position between the initial position and the fully released position, the four cam pins 15 of the punch needle driving cam 7 all complete the mesh transmission with one punch needle tooth 11-3, at which time the last cam pin 15 of the punch needle driving cam 7 happens to be disengaged from the punch needle tooth 11-3, and the clutch pawl 10 just happens to be jammed into the notch 11-5, and the notch 11-5 is not able to move toward its movable end 11-2 (i.e., downward) under the action of the punch needle 11, as shown in FIG. 20. Under the action of the notch 11-5, the punch pin 11 cannot move toward its movable end 11-2 (i.e., downward), as shown in FIG. 20.

Referring to the accompanying FIG. 17, when the inductive photocoupler shading along 11-4 completely leaves the inductive photocoupler 8, the inductive photocoupler 8 sends a signal to control the motor 3 to start braking and stopping. As a preferred technical solution, the accumulator 12 is a spring or a compressed gas.

The working process of the present invention: the motor 3 through the gear box 4 drive the punch driving cam 7 rotation, cam pin 15 and punch needle teeth 11-3 meshing, drive the punch needle 11 upward movement, in order to increase the stroke of the punch needle linear movement, compressed gas or spring and other accumulators 12, drive cam needs to be rotated twice or even more to achieve, the punch needle and the clutch pawl 10, the unidirectional bearings 5 with the role of the punch needle to ensure that the punch needle in the Accumulate enough potential energy in the process of unidirectional accurate movement. Punch needle on the design of the punch needle teeth, clutch pawl jump platform, inductive photocoupler notch, inductive photocoupler blocking edge 11-4 and auxiliary intelligent identification of identification holes 11-9, before the completion of the energy storage, the punch needle on the inductive photocoupler blocking edge rises, inductive photocoupler 8 through the photocoupler induction notch 11-10, inductive photocoupler sensing signals, signals sent to the control circuit, the motor brakes to stop, the cam pin 15 and the punch needle teeth 11-3 Keep engaged. Under the action of the one-way bearing, the punch pin stops at a certain position, keep the energy storage state, at this time buckle the board machine, the motor drives the drive cam rotation, the cam pin forward no longer engage with the punch pin teeth, the punch pin instantly release, downward movement rushed to the nail, the induction photocoupler by the punching pin on the photocoupler sensing notch 11-10 into the induction photocoupler masking along the 11-4, the induction photocoupler senses the signal sent to the control circuit, the motor brake drives the cam to stop rotating. The punch needle continues to move downward at high speed, the movement process, the clutch pawl in the punch needle clutch pawl under the action of the jump platform, smooth over the punch needle on the clutch pawl with the gap, when hitting the nail in the process did not appear a variety of factors affecting the effect of hitting the nail or even destroy the nail gun (card nail, wood has a knot, too hard, inside the foreign objects, such as broken inside the nail, etc., or hit the bias, hit in the stone and other hard objects above), the punch needle without obstacles to hit the nail Nails into the board and other objects, this time through the buffer pad compression and rebound, the gun needle through the recognition of the recognition of intelligent recognition above it, to the inductive photocoupler three times the signal, the motor starts, drives the cam, the inductive photocoupler on the punching needle to shield the plane rises, the inductive photocoupler into the pin photocoupler induction notch, the inductive photocoupler sense the signal to the control circuit, the motor cuts off and stops rotating, the cam pin and the punching needle teeth to keep engaging in the unidirectional Under the action of the bearing, the punch needle stops at a certain position, maintain the energy storage state, nail gun back to the brake stopping state, pull the trigger to enter the next nail cycle. When the nailing process occurs a variety of factors that affect the effect of nailing or even damage the nail gun (nail jam, wood knot, too hard, wood inside a foreign object, such as broken nails inside, etc., or hit the bias, hit in the stone and other hard objects above), the inductor photocoupler cannot be identified through the gun pin on the auxiliary intelligent identification of the recognition of holes in the complete three times the signal, the nail gun will be identified through the recognition of holes in the number of signals to the sensor photocoupler sensed by the smart The nail gun will recognize the number of signals sensed by the recognition hole to the sensor photocoupler for intelligent recognition, giving the corresponding operation mode, so as to realize the purpose of protecting the nail gun from damage.

It is to be understood that, to a person skilled in the art, equivalent substitutions or changes to the technical solutions and inventive concepts of the present invention should fall within the scope of protection of the appended claims of the present invention.

What is claimed is:

1. An apparatus for intelligently identifying a nail gun punch pin, provided in a nail gun housing (1), wherein Said nail gun shell (1) is fixed with nail clip (2), assembly frame body (6) and energy accumulator (12), nail clip (2) is set below assembly frame body (6) for feeding nails into assembly frame body (6), energy accumulator (12) is set at the rear of assembly frame body (6), and a motor (3) is set in the nail gun shell (1) to drive the rotation of the punch driving cam (7);

The assembly frame body (6) is slidingly provided with a punch needle (11), the fixed end (11-1) of the punch needle (11) is fixed on the piston (14) of the accumulator (12), and the movable end (11-2) of the punch needle (11) is slidingly provided inside the assembly frame body (6) for hitting the nails inside the assembly frame body (6); the said punch needle driving cam (7) and the clutching pawl (10) are provided on both sides of the punch needle (11), the punch needle teeth (11-3) are provided at the edge of the side of the punch needle driving cam (7), and a number of cam pins are provided on the punch needle driving cam (7); The said needle driving cam (7) and clutch pawl (10) are provided on both sides of the punch needle (11), the punch needle (11) is provided with punch needle teeth (11-3) at the edge of the side facing the punch needle driving cam (7), the punch needle driving cam (7) is provided with a number of cam pins (15), the punch needle driving cam (7) engages and transmits with the punch needle teeth (11-3) by means of the cam pins (15) to drive the punch needle (11) between the initial position and the fully released position;

The punch (11) is provided with an inductive photocoupler masking edge (11-4) at the edge of the side of the punch (11) toward the clutch pawl (10) for selectively masking the inductive photocoupler (8) provided next to the clutch pawl (10), and the inductive photocoupler (8) is communicatively controlled to the motor (3) using a control circuit; The photocoupler sensing notch (11-10), mating notch (11-5) and identification hole (11-9) are provided in turn on the sensing photocoupler blocking edge (11-4), when the photocoupler sensing notch (11-10) passes through the sensing photocoupler (8), the sensing photocoupler (8) sends out a blocking or un-blocking signal to the control circuit, and controls the motor (3) to stop rotating; the said mating notch (11-5) is provided to be matched with the snap into the clutch pawl (10), the mating notch (11-5) is provided with a left jumper (11-7) on the inductive photocoupler blocking edge (11-4) near the movable end (11-2) side, and the mating notch (11-5) is provided with a right jumper (11-8) on the inductive photocoupler blocking edge (11-4) near the stationary end (11-1) side, and the left jumper (11-7) is larger than the right jumper (11-8); when the clutch pawl (10) leaves the left jumping platform (11-7) and moves toward the matching gap (11-5), the clutch pawl (10) crosses the matching gap (11-5) in an arc trajectory and falls on the right jumping platform (11-8); the lower mouth of the accumulator (12) is equipped with a cushion (17), which is used to provide a rebound force for the piston (14), and when the piston (14) moves downward just to contact with the cushion (17), the piston (14) moves downward just to contact with the cushion (17), and then the piston (14) moves downward just to contact with the right jumping platform (11-5), When the piston (14) moves downwardly to just contact with the cushion (17), the recognition hole (11-9) on the punch (11) is just aligned with the inductive photocoupler (8).

2. The apparatus for intelligently identifying a nail gun punch pin according to claim 1, wherein said assembly rack body (6) includes upper plate (6-2) and lower plate (6-3), the punching needle (11) is slidingly set between the upper plate (6-2) and the lower plate (6-3); the upper surface of the lower plate (6-3) is provided with a cam (6-4), which is used to cooperate with the groove (11-6) set in the lower surface of the punching needle (11), the punching needle (11) slides along the cam (6-4) to realize guidance; the lower surface of the lower plate (6-3) is provided with a nail entry port (6-5), the nail entry port (6-5) guides the punching needle (11) along the upper plate (6-3) to realize guiding (6), the punch needle (11) slides along the tab (6-4) to realize guidance; the lower surface of the lower plate (6-3) is provided with a nail entry port (6-5), which penetrates the tab (6-4), so that the nails at the top of the said nail clamps (2) enter the assembling frame body (6) along the nail entry port (6-5).

3. The apparatus for intelligently identifying a nail gun punch pin according to claim 1, wherein when said punch pin (11) slides to the intermediate energy storage position between the initial position and the energy storage position, the cam pin (15) of said punch pin driving cam (7) happens to be disengaged from the punch pin teeth (11-3), and said clutch pawl (10) happens to be jammed inside the notch (11-5), so as to restrain the punch pin (11) from towards its movable end (11-2).

4. The apparatus for intelligently identifying a nail gun punch pin according to claim 1, wherein said motor (3) is connected to a drive camshaft (13) through a gearbox (4), and the camshaft (13) is provided with a one-way bearing (5) so as to drive the punch needle drive cam (7) to rotate unidirectionally.

5. The apparatus for intelligently identifying a nail gun punch pin according to claim 1, wherein said accumulator (12) is a spring or a compressed gas.

* * * * *